US008267200B2

(12) United States Patent
Fout et al.

(10) Patent No.: US 8,267,200 B2
(45) Date of Patent: Sep. 18, 2012

(54) CUTTINGS TREATMENT AND REUSE

(75) Inventors: Gary E. Fout, Cypress, TX (US); John Candler, Houston, TX (US); Kayli Clements, Houston, TX (US); Will Marchbanks, Brookshire, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 13/338,393

(22) Filed: Dec. 28, 2011

(65) Prior Publication Data

US 2012/0090899 A1 Apr. 19, 2012

Related U.S. Application Data

(63) Continuation of application No. 12/050,796, filed on Mar. 18, 2008, now Pat. No. 8,100,198.

(60) Provisional application No. 60/896,635, filed on Mar. 23, 2007.

(51) Int. Cl.
E21B 21/06 (2006.01)
(52) U.S. Cl. .......................................... 175/66
(58) Field of Classification Search .................. None
See application file for complete search history.

(56) References Cited

U.S. PATENT DOCUMENTS 5,882,524 A * 3/1999 Storey et al. ................. 210/712
7,059,805 B1 6/2006 Addison, Sr.

OTHER PUBLICATIONS

Substantive Examination Report issued in corresponding Malaysian Application No. PI 20093953; Dated Feb. 15, 2012 (2 pages).

* cited by examiner

Primary Examiner — Zakiya W Bates
(74) Attorney, Agent, or Firm — Osha Liang LLP

(57) ABSTRACT

A method for treating drill cuttings including depositing drill cuttings in a desalinization cell, the desalinization cell having a high end, a low end, and a cuttings pad. The method further includes washing the drill cuttings in the desalinization cell with a liquid phase and removing a cuttings runoff from the drill cuttings. Also, a method for treating drill cuttings including depositing drill cuttings in a desalinator, the desalinator having a geometric structure having a perforated side. The method further includes adding a liquid phase to the desalinator through the perforated side, washing the drill cuttings in the desalinator with the liquid phase, and producing desalinated drill cuttings and a cuttings runoff.

9 Claims, 2 Drawing Sheets

CUTTINGS TREATMENT AND REUSE

CROSS-REFERENCE TO RELATED APPLICATIONS

This application claims benefit, pursuant to 35 U.S.C. 120, to U.S. patent application Ser. No. 12/050,796, filed Mar. 18, 2008, which is incorporated herein by reference in its entirety. The '796 application claims priority, pursuant to 35 U.S.C. 119(e) to U.S. Provisional Patent Application No. 60/896,635, filed Mar. 23, 2007. That application is expressly incorporated by reference in its entirety.

BACKGROUND

1. Field of the Disclosure

The present disclosure generally relates to methods for handling, treating, and disposing of drilling cuttings from drilling operations. More particularly, the present disclosure relates to methods for desalinating drill cuttings and using desalinated drill cuttings in post-drilling operations.

2. Background Art

In drilling operations for the exploration of oil and gas, a liquid slurry known as drilling mud is used for maintenance and lubrication of the borehole created during the drilling operation. Typically, the drilling mud system of a well includes a mud holding tank at the well surface located on or adjacent to the drilling rig and a network of pumps, mixers, and mud supply lines. During drilling operations, drilling mud is pumped from the mud holding tank, through the mud supply lines, down through the well bore and circulated at a desired rate, and is returned to the surface of the well bore. The returned drilling mud carries with it drill cuttings from the bottom of the borehole produced as drilling advances. When the circulating drilling mud, along with the carried drill cuttings is returned to the surface, it is delivered to a screening device known as a shaker that serves as a sieve for removing the carried drilling cuttings from the drilling mud. When the drill cuttings have been removed from the drilling mud by the shaker, the drilling mud is returned to the mud storage tank for reuse. The drill cuttings separated from the drilling mud are collected and conveyed to storage tanks for treating and disposal.

The storage and disposal of drill cuttings produced at a drilling location may present a number of problems. The drill cuttings removed from the borehole are typically comprised of shale, sand, hard clays, or shell, and they are often coated with, or contain, residual contaminants from the drilling mud of from the borehole. The drill cuttings and their contaminants present environmental concerns that must be addressed during their disposal.

Transporting the drill cuttings from a rig site to a disposal facility is also a concern because of the costs associated with transporting the bulky, heavy cuttings boxes to and from the well location. Additionally, drill cuttings typically contain oil, petroleum distillates, and other environmentally unsuitable contaminants and often must undergo some treatment to remove or render inert any associated contaminants prior to their disposal. Such treatment is time consuming and expensive because it is typically conducted away from the rig location.

In some drilling operations, new waste management techniques (e.g., closed loop dewatering) now allow onsite drill cutting processing that may substantially decrease drill cutting volume. At such drilling operations, it may be beneficial to dispose of the drill cuttings onsite. Typically, onsite drill cutting disposal consists of plowing (i.e., land-farming) cuttings into the land, such that the cuttings stay on the land during storms. However, such land-farming methods are only available if the cuttings are found to be non-hazardous (e.g., contain less than 3000 mg/kg of chlorides and/or less than 1000 mg/L of oil) according to the laws of the local governing agency.

Many localities have separate laws that regulate the disposal of drilling cuttings if the drilling operation is located on a wetland. Currently, many jurisdictions do not allow the land-farming of drill cuttings on recognized wetlands. Instead, the drill cuttings have to removed and properly disposed of outside the drill site.

In still other jurisdictions, if drill cuttings are found to be hazardous (i.e., contain greater than 3000 mg/kg of chlorides and/or greater than 1000 mg/L of oil) according to the laws of the local governing agency, the drill cuttings may be buried onsite. In such a drilling operation, pits may be created at the drilling site and the drill cuttings buried therein. Buried drill cuttings are buried so as to not cause the pollution of ground water or sub-surface water bearing formations. To prevent contamination as a result of the buried cuttings, the pits may have to be lined, chemicals may have to be injected, and the pits may have to be covered with earth or other substrate. In many drilling operations, the burial of drill cuttings is time consuming, potentially environmentally dangerous, and cost inefficient.

In other drilling operations, including operations that drill through large salt deposits, hazardous cuttings may contain large amounts of chlorides that may require desalinization prior to disposal. Desalinization operations may include use of chemical treatments and/or other operations that are time consuming, labor intensive, and expensive. Alternatively, in certain operations, other expensive methods of remediating drill cuttings may be used including, for example, cuttings re-injections. However, these alternative remediation methods may also be time consuming, labor intensive, and expensive.

Accordingly, there exists a need for an environmentally safe and cost efficient system and method for desalinating drill cuttings from drilling operations.

SUMMARY OF THE DISCLOSURE

In one aspect, embodiments disclosed herein relate to a method for treating drill cuttings including depositing drill cuttings in a desalinator, the desalinator having a geometric structure having a perforated side. The method further includes adding a liquid phase to the desalinator through the perforated side, washing the drill cuttings in the desalinator with the liquid phase, and producing desalinated drill cuttings and a cuttings runoff.

Other aspects and advantages of the disclosure will be apparent from the following description and the appended claims.

DETAILED DESCRIPTION

Generally, embodiments disclosed herein relate to methods for the handling, treatment, and disposing of drill cuttings. More specifically, embodiments disclosed herein relate to methods for desalinating drill cuttings and using desalinated drill cuttings in post-drilling operations.

Typically, drilling fluids used in drilling operations return from down hole as a slurry, which includes drill cuttings and other suspended particulate matter. Initially, the used drilling fluid may undergo any number of separation techniques (e.g., centrifugation, screen, mud cleaners, and shaking) to remove large drill cuttings from the fluid. While the aforementioned methods may remove large drill cuttings, other solids and fine particulate matter may remain suspended in the drilling fluid. Recent advances in dewatering technology (i.e., coagulation and flocculation) allows further removal of suspended solid particulates from the drilling fluid. After such separation and dewatering, the cleaned drilling fluid may be recirculated to a drilling fluid storage tank for eventual reuse in the drilling operation.

While the drilling fluid is reusable, the drill cuttings and other solid particulate matter is generally not reusable. As such, drill cuttings are often stored onsite for eventual removal from the drill site. While storage methods vary, many drilling operations use storage bins, surface storage, pit storage, or bagged storage prior to removal from the drill site. During storage, additional cleaning operations may be performed on the drill cuttings to decrease the presence of hazardous drilling waste. Such cleaning operations may include, for example, mechanical and/or chemical treatment to decrease the presence of environmentally damaging drilling byproducts such as chlorides and oil. However, depending on the type of contamination, no additional mechanical or chemical treatment may be required. As such, embodiments of the present disclosure may include the treatment of drill cuttings that either have or have not been mechanically or chemically treated.

For clarity, as used herein, the term desalinization may include the removal of salts, including alkali or alkaline earth metal halides, such as sodium chloride or calcium chloride, hydroxides, such as potassium hydroxide, or other contaminants found in drill cuttings. Additionally, the decrease such contaminants to an "acceptable environmental level" includes decreasing a contaminant concentration to a level in accordance with local, state, or federal regulations. Thus, an "acceptable environmental level" may vary according to jurisdiction, region, and/or locality, and is not intended to create a specifically defined range.

Figure 1:
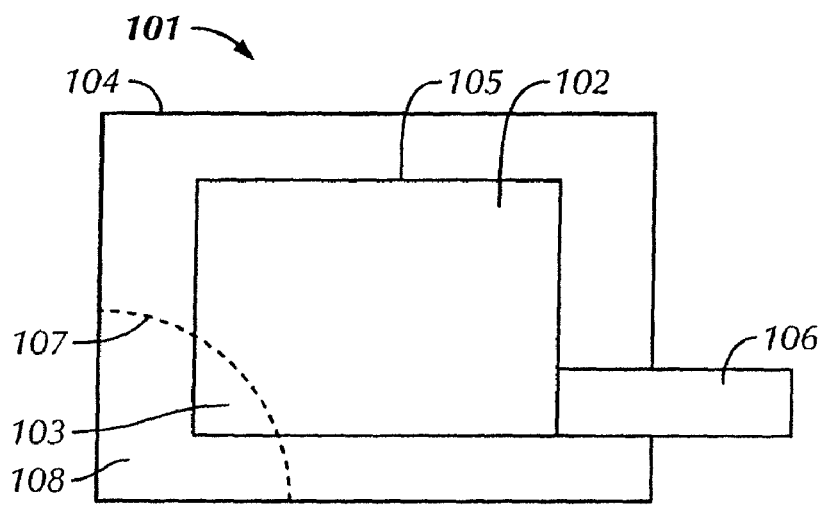
FIG. 1 shows a top view of a desalinization cell in accordance with embodiments of the present disclosure.

Referring initially to FIG. 1, a top view of a desalination cell 101, according to embodiments of the present disclosure, is shown. In this embodiment, desalinization cell 101 includes a high end 102 and a low end 103. The desalination cell 101 also includes an exterior confining structure 104, a cuttings pad 105, and a ramp 106. The exterior confining structure 104, in one aspect, may include an impermeable boundary to confine deposited drill cuttings, liquids, cuttings runoff, or other substances that may either be present on deposited drill cuttings or added to the drill cuttings to expedite treatment.

Operationally, drill cuttings may be deposited on the cuttings pad 105 such that a substantially even layer of drill cuttings is deposited thereon. Alternatively, drill cuttings may be deposited on cuttings pad 105 such that a larger volume of drill cuttings is deposited proximate high end 102. In still other embodiments, it may be operationally more efficient to deposit a relatively larger volume of drill cuttings proximate low end 103. Those of ordinary skill in the art will appreciate that the precise location of the deposited cuttings may vary according to the requirements of specific drilling operations.

Additionally, cuttings pad 105 may include any number of impermeable substrates including, for example, plastics, poly-urethanes, composites, and other substrates capable of preventing hazardous chemical from leaching into surrounding areas. In certain embodiments, the cuttings pad 105 may also include substantially permanent structures, such as, for example, concrete or otherwise reinforced reservoirs. Those of ordinary skill in the art will appreciate that cuttings pad 105 may include any type, shape, thickness, or porosity to adhere to the environment or operational requirements at a cuttings treatment location.

In this embodiment, lower end 103 is represented as extending from exterior confining structure 104 into the area of cuttings pad 105. The lower end 103 is generally illustrated as including the area partitioned by dashed line 107. Thus, in one aspect, lower end 103 may only partially include the area of cuttings deposition. However, in alternate embodiments, those of ordinary skill in the art will appreciate that lower end may encompass a more substantial portion of cuttings pad 105 including an area constituting, for example, greater than 50% of the area occupied by cuttings pad 105. In still other embodiments, cuttings pad 105 may extend to include the entire area covered by desalinization cell 101. As such, cuttings pad 105 may extend to, extend past, or otherwise terminate at exterior confining structure 104.

In certain embodiments, the area between exterior confining structure 104 and cuttings pad 105 may include a recessed sump 108. Sump 108 may be artificially created by, for example, digging a trench around the treatment location, or may naturally occur due to the topography of the treatment location, deposition of drill cuttings, or as a result of external confining structure 104. In one aspect, cuttings pad 105 may extend to substantially cover sump 108. However, in other aspects, sump 108 may be reinforced by additional substantially impermeable material to prevent the leaching of hazardous waste products into the treatment location substrate.

As illustrated, FIG. 1 includes ramp 106 to ease the transportation of drill cuttings into desalination cell 101. In this embodiments, ramp 106 may be necessary to efficiently facilitate cuttings deposition, however, those of ordinary skill in the art will appreciate that in other embodiments, desalinization cell 101 may be dug into the ground, such that ramp 106 may be unnecessary. Furthermore, other desalinization cell 101 design modifications may be necessary or desirable to facilitate the treatment of cuttings. Such additional components may include, for example, piping (not shown) to allow for the removal of cuttings runoff from desalinization cell 101, chemical injection ports (not shown) to allow for the addition of chemicals to further remediate the drill cuttings, and water injection ports (not shown) to add additional free water to dilute chlorides in the drill cuttings.

Those of ordinary skill in the art will further appreciate that the size of desalinization cell 101 may vary depending on the volume of cuttings that require treatment. Thus, in one embodiment, the desalinization cell 101 may only cover an area of several hundred square feet. However, in other embodiments, desalinization cell 101 may occupy an area including several acres. Such large scale operations may include additional design modifications to facilitate the treatment of cuttings therein. Examples of such modifications may include several high ends 102 that feed into a single low end 103, on high end 102 that feeds into several low ends 103, multiple sumps 108 traversing high ends 102 and/or low ends 103, and multiple areas of volumous drill cuttings deposition.

Figure 2:
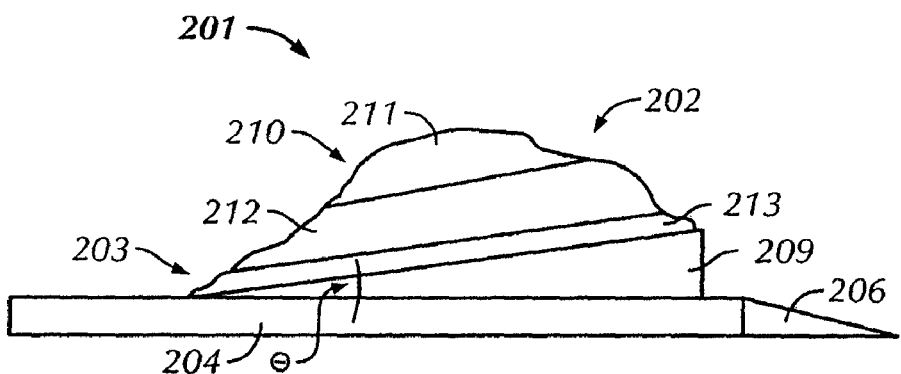
FIG. 2 shows a side view of a desalinization cell in accordance with embodiments of the present disclosure.

Referring now to FIG. 2, a side view of a desalinization cell 201, according to embodiments of the present disclosure, is shown. In this embodiment, desalinization cell 201 includes a high end 202 and a low end 203. Desalinization cell 201 also includes an inclined section 209 onto which drill cuttings 210 are deposited. Inclined section 209 and drill cuttings 210 are confined within desalinization cell 201 by external confining structure 204. Desalinization cell 201 also includes a ramp 206 to facilitate the deposition of drill cuttings therein.

As illustrated, drill cuttings 210 are shown as divided into 3 distinct regions. A first region of low chloride content 211 (i.e., a top layer), a second region of partial chloride content 212 (i.e., a middle layer), and a third region of high chloride content 213 (i.e., a lower layer). The chloride content is determined by both the time drill cuttings 210 have been deposited in desalinization cell 201 and the amount of liquid phase that has contacted the drill cuttings 210.

In one embodiment, the desalinization cell 201 is substantially open to the environment, thereby not including a covering or housing structure. As such, as rain falls on the cuttings, the rain washes the top layers of cuttings 211, diluting out contaminants, and washing such contaminants to the bottom layers 213. Because drill cuttings 210 are deposited on inclined section 209, the cuttings runoff (i.e., the rain water including contaminants) flows down through lower section 213 and collects in low end 203 of desalinization cell 201. As described above, low end 203 may further include a sump (not shown) for collecting cuttings runoff, or cuttings runoff may be collected, piped to other parts of the treatment operation, evaporated, or otherwise disposed of.

Those of ordinary skill in the art will appreciate that the angle of inclination $\Theta$ of inclined section 209 may vary according to operational limitations. However, generally, the greater the angle of inclination $\Theta$, the greater speed at which cuttings runoff will exit lower section 213. However, angle of inclination $\Theta$ may not be so great that drill cuttings 210 slide down inclined section 209. Thus, the precise angle of inclination $\Theta$ of incline section 209 may be varied according to, for example, the type of drill cuttings 210 being treated, typical environmental conditions of the area of the treatment location, the amount of liquid phase effecting drill cuttings 210, or other considerations as determined by the treatment operator.

Figure 3:
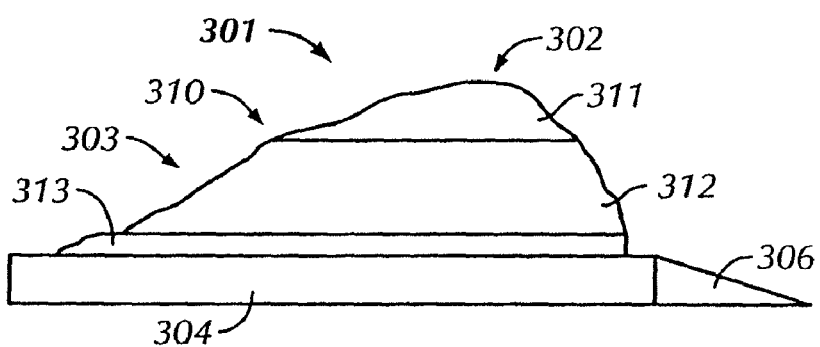
FIG. 3 shows a side view of a desalinization cell in accordance with embodiments of the present disclosure.

Referring now to FIG. 3, a side view of a desalinization cell 301, according to embodiments of the present disclosure, is shown. In this embodiment, desalinization cell 301 includes a high end of drill cuttings deposition 302 and a low end of drill cuttings deposition 303. Desalinization cell 301 also includes a ramp 306 to facilitate the deposition of drill cuttings therein.

In this embodiment, drill cuttings 310 are deposited in desalinization cell 301, such that their deposition forms an incline that includes high end 302 and low end 303. Thus, in this embodiment, there is not an additional incline portion that artificially creates the incline. Instead, the drill cuttings 310 are strategically placed to form the incline, thereby facilitating the removal of cuttings runoff therefrom.

Figure 4:
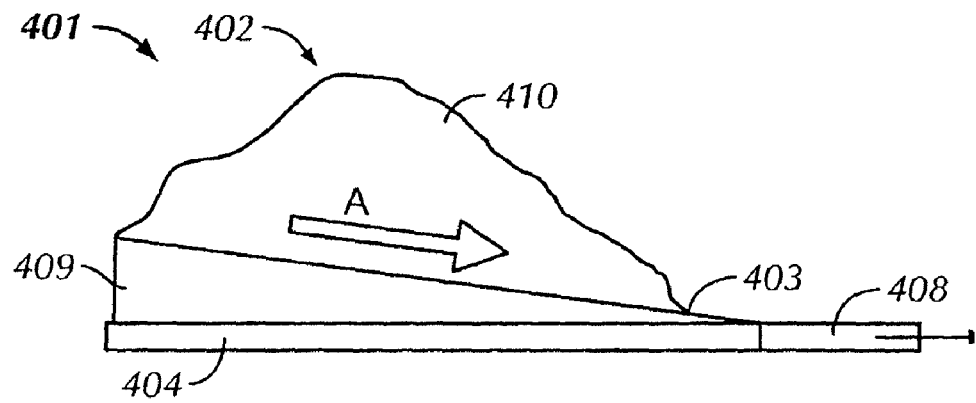
FIG. 4 shows a side view of a desalinization cell in accordance with embodiments of the present disclosure.

Referring to FIG. 4, a side view of a desalinization cell 401, according to embodiments of the present disclosure, is shown. In this embodiment, desalinization cell 401 includes drill cuttings 410 deposited on an incline portion 409 to form a high end 402 and a low end 403. Incline portion 409 and drill cuttings 410 are confined by exterior confining structure 404.

In this embodiment, as drill cuttings 410 are contacted by rain or another liquid phase, the cuttings runoff (including the liquid phase) passes through drill cuttings 410 along path A to lower end 403. At lower end 403, the cuttings runoff collects in sump 408. As illustrated, sump 408 is a collection reservoir that collects cuttings runoff via gravity transference from the deposited drill cuttings 410. However, in alternate embodiments, sump 408 may be structurally disconnected from external confining structure 404 and incline portion 409 and the collection of cuttings runoff may be pumped thereto.

In this embodiment, after collection of cuttings runoff, the runoff may be exposed to sunlight or another heat source to facilitate evaporation. Those of ordinary skill in the art will appreciate that as sunlight contacts the cuttings runoff, the liquid phase may evaporate while the contaminates may be separated for recycling into drilling mud or otherwise disposed of. To achieve efficient evaporation, in certain embodiments, sump 408 may be an area of substantial area such that the depth of cuttings runoff is relatively small, for example, only several inches in depth. Because the depth of cuttings runoff is relatively small, the runoff may evaporate more quickly, thereby increasing the efficiency of the treatment operation.

In still other embodiments, once the cuttings runoff is collected in sump 408, chemicals may be added to further enhance the treatment operation. Chemical additives that may be used in cuttings treatment include, for example, surfactants, sodium silicate, zeolites, and other additives useful in the treatment of drilling waste. Those of ordinary skill in the art will appreciate that in certain embodiments, the cuttings runoff may be used in other aspects of a drilling operation including, for example, reuse in drilling mud and cuttings re-injection. Additionally, cleaned cuttings runoff (i.e., runoff of a low contaminant level) may be used to rewash the drill cuttings. Such rewashing operations may further increase the efficiency of the treatment operation because a greater volume of liquid phase will contact the drill cuttings in a given time interval. However, in such rewashing operations, those of ordinary skill in the art will appreciate that the liquid phase of the rewash should be low in contaminant levels so that each successive treatment cleans the cuttings with a liquid phase of lower contaminant level than that of the deposited drill cuttings. Thus, as the upper levels of cuttings become substantially clean, the ability to use rewashing operations may be decreased.

The above described treatment operations may provide methods to remove contaminants, salts, impurities, and other hazardous drill waste from drill cuttings. However, the efficiency of the drill operation may be directly related to the availability of fresh water sources or other liquid phases used in washing the cuttings. In certain regions, water sources for the liquid phase may include rainwater, water collected in stills, and water collected from streams and lakes. Thus, the availability of water sources may dictate the speed at which cuttings are treated. However, in areas that have an abundance of water sources, additional methods of treating drill cuttings may include the use of a desalinator.

Figure 5:
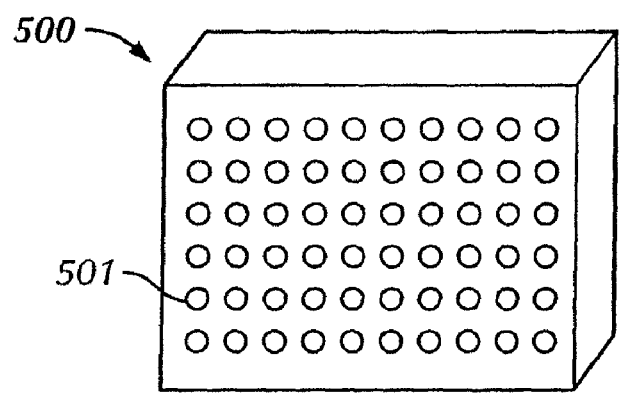
FIG. 5 shows a perspective view of a desalinator in accordance with embodiments of the present disclosure.

Referring to FIG. 5, a perspective view of a desalinator 500, according to embodiments of the present disclosure, is shown. In this embodiment, desalinator 500 includes a box-like structure wherein one side of the box-like structure is perforated. The perforated side includes a plurality of small holes 501 providing an outlet in the desalinator such that a liquid phase may flow therethrough. Those of ordinary skill in the art will appreciate that the number of holes, the size of the holes, and the spacing of the holes may vary according to the size of drill cuttings being processed. Thus, for smaller particulate size drill cuttings, the perforations 501 may be relatively small, however, if the drill cuttings are larger, the size of the perforations may be increased to allow the flow of water to wash over the drill cuttings more quickly. Likewise, the number of perforations may be increased to increase a fluid flow into desalinator 500 or to increase a fluid flow out of desalinator 500. Furthermore, in alternate embodiments, perforations may cover more than one side. For example, perforations may cover two substantially opposite sides (e.g., a top and a bottom side) to allow a fluid to enter through the top of desalinator 500 and exit out of the bottom. Those of ordinary skill in the art will appreciate that such an embodiment may substantially increase the fluid flow through desalinator 500 such that the chlorides and other contaminants are removed more quickly.

Operationally, desalinator 500 may be used to remove contaminants from cuttings in a number of different ways. Below, two such methods are discussed for how desalinator 500 may be used; however, those of ordinary skill in the art will appreciate that in alternate embodiments, desalinator 500 may be used in alternate ways.

In one embodiments, desalinator 500 may be filled with drill cuttings by opening one side of the geometric structure, depositing the drill cuttings therein, then securably closing the opened side. Desalinator 500 may then be lifted using, for example, heavy machinery, and placed in a pool of a liquid phase, in this example, water. Preferably, the pool of water is deep enough such that desalinator 500 is sufficiently submerged, so that water enters desalinator 500, and washes over the drill cuttings. After sufficient time has passed, and the water has sufficiently washed the drill cuttings, the desalinator 500 is lifted out of the water. In such an embodiment, the perforated side should generally be disposed such that when desalinator 500 is removed from the water, the water may exit desalinator 500 through, in this embodiment, the bottom side.

In one aspect, such a submergence washing may allow the liquid phase to enter desalinator 500 and contact the drill cuttings for a relatively long period of time. Such a submergence may be beneficial when a supply of liquid phase is readily available, and when the level of contaminants in the drill cuttings is relatively low. Those of ordinary skill in the art will appreciate that in such an operation, periodic cleaning of the pool of liquid phase may be required to prevent high levels of contaminants from forming in the pool.

After the cuttings are removed from the pool of liquid phase they may be low enough in contaminant level such that no additional treatment operation may be required. In such a situation the drill cuttings may be immediately used in other aspects of the drilling operation, sent for disposal, used in a cuttings re-injection operation, or otherwise used as disclosed in the present application. However, in certain aspects, the addition of chemical additives may be required to further remediate and/or further remove contaminants from the drill cuttings. In still other aspects, it may be beneficial to evaporate the remaining liquid phase from the drill cuttings to, for example, decrease the weight of the drill cuttings, thereby making transportation more efficient. Examples of methods of evaporating the liquid phase from the drill cuttings may include leaving the cuttings under a heat source (e.g., the sun), or removing the drill cuttings from desalinator 500, spreading them over a surface, and allowing the liquid phase to naturally evaporate. Those of ordinary skill in the art will appreciate that in one aspect, evaporation of residual liquid phase may require spreading the drill cuttings in a relatively thin layer over a cuttings pad, or other impermeable surface, to prevent the leaching of an residual contaminants therethrough.

In another embodiment, desalinator 500 may be opened, filled with drill cuttings, and then securably closed. In this embodiment, desalinator 500 includes two perforated sides, one on a top side and one on a bottom side. Desalinator 500 is then positioned to allow the flow of a liquid phase from one perforated side through the drill cuttings and out of the second perforated side. Examples of how desalinator 500 may be positioned includes lifting desalinator 500 off the ground using heavy machinery or tilting desalinator 500 on its side so that the liquid phase may pass therethrough.

This aspect may be beneficial for use in treatment operations where water is readily available and the drill cuttings are relatively high in contaminants. In the operation of such a treatment operation, water is sprayed into desalinator 500 through a top perforated side, passes through the drill cuttings, and exits through the bottom perforated side. Thus, the water may continuously be added to desalinator 500 and allowed to pass through the drill cuttings until an acceptable level of contaminants has been achieved. Methods of spraying the liquid phase into desalinator 500 may include injection through a perforated side, spraying over the perforated side, allowing the liquid phase to continuously drip over the drill cuttings, or otherwise allowing the liquid phase to enter desalinator 500.

Those of ordinary skill in the art will appreciate that the time the liquid phase contacts the drill cuttings is an operational consideration that may vary according to a number of factors including, for example, the level of contamination, local environmental regulations, amount of water, and intended use of the drill cuttings. Such operational considerations may be discretionarily modified according to operational considerations, and are thus not limiting on the scope of the present disclosure. Additionally, those of ordinary skill in the art will appreciate that additional components may be added to desalinator 500 to increase the efficiency of the operations. Examples of such optional components may include chemical injection ports, additional perforated sides, methods of adding mechanical agitation to the drill cuttings, and other components known in the art for increasing the efficiency of treating and cleaning drill cuttings. Furthermore, any of the additional methods of collecting, recycling, and otherwise treating the cuttings runoff, as described above, may also be used with embodiments of the present disclosure having desalinator 500.

While the above embodiments are described in relation to methods for treating drill cuttings, after the drill cuttings have been treated, they may be reused in construction operations. In such an embodiment, the drill cuttings may be transferred to an onsite processing location. At the processing location, the drill cuttings may be impounded into construction materials (e.g., berms, location bases, production pads, and/or road base). One of ordinary skill in the art will realize that the processing location may also include the drilling location. For example, in one embodiment, drill cuttings may be taken from a collection area and placed on the surface of another section of the drill site. The drill cuttings may then be impounded on the surface to form a base of another drilling rig. Alternatively, the drill cuttings may be impounded at the drill site in the form of road beds, berms, or otherwise used in the construction of drilling facilities.

In alternative embodiments, the drill cuttings may be transferred to a processing location for eventual distribution of the drill cuttings for use as road base at on off site location. In this embodiment, the drill cuttings may be used as road base in the construction of typical public and/or private roadways. Because the drill cuttings will be sealed (e.g., with concrete, asphalt, and/or tar) in the construction of the roads, the drill cuttings may be used as road base without significant cleaning/dewatering.

In one embodiment of the present disclosure, the drill cuttings may be transferred from a drilling location to a disposal site and them impounded into a monolith. The monolith may include only drill cuttings, or a mixture of drill cuttings and solidification reagent, as discussed above. In such an embodiment, the monolith may be of any size such that movement of the monolith by dispersal and/or other moving devices is possible. After impoundment into a monolith, the drill cuttings may be placed on the surface of the disposal site. In one embodiment, the monolith may be placed on the surface of the drilling site in a manner to provide benefit to the drilling location. One such benefit may be placing the monolith to promote water runoff in a specified direction. Other benefits may include, for example, placing a plurality of monoliths as a roadbed, as a base layer for a new drilling rig, or as construction materials, as described above. To allow the greatest storage of monolithically impounded drill cuttings, it may be beneficial to stack the monoliths in a generally pyramidal shape. Such a shape may enhance water runoff, impoundment, and provide increased storage potential.

While the above described embodiments relate to methods for disposing of drill cuttings, one of ordinary skill in the art will appreciate that a system for disposing drill cuttings using surface impoundment is also within the scope of the present disclosure. In one embodiment a system may include a drill cuttings dispersal device to transfer drill cuttings from a cleaning (i.e., dewatering site) to a disposal site. It may be desirable that the disposal site is in close proximity to the cleaning site so as to decrease the cost associated with moving the drill cuttings. The system may also include a drill cuttings pad located on the surface of the disposal site, such that the drill cuttings dispersal device may move drill cuttings from the cleaning site to the drill cuttings pad. Once on the drill cuttings pad, the drill cuttings may be impounded by any means known to one of ordinary skill in the art, including, but not limited to, compressing the drill cuttings with heavy machinery, allowing water to impound the drill cuttings, or placing additional drill cuttings and allowing the weight of the drill cuttings to impound themselves. Specific methods of impounding drill cuttings are discussed in U.S. Application No. 60/829,323, assigned to the assignee of the present application, and hereby incorporated by reference in its entirety.

Figure 6:
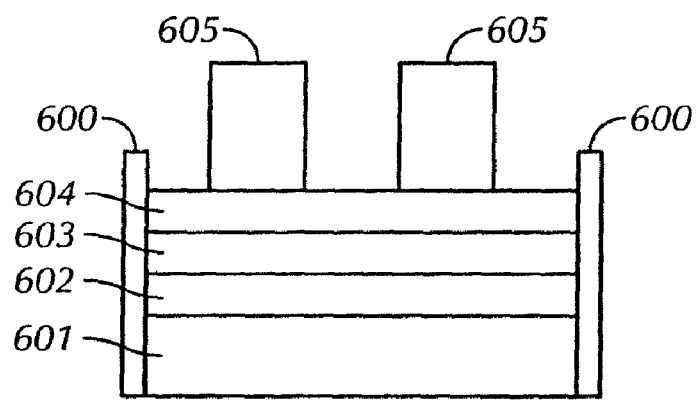
FIG. 6 shows a cross-sectional view of a construction operation in accordance with embodiments of the present disclosure.

Referring to FIG. 6, a cut-away side view of a production facility, according to embodiments of the present disclosure, is shown. In this embodiment, desalinated drill cuttings may be removed from the treatment location. Removing the cuttings from the treatment location may include using heavy machinery to lift desalinated drill cuttings from the desposition location. Those of ordinary skill in the art will appreciate when the drill cuttings are removed, measurements for contaminants such as, for example, measuring a chloride level to determine if the cuttings are within an acceptable level, may be required. However, in alternate embodiments, during the construction operation, further dilution of the drill cuttings may make such measurements unnecessary.

As desalinated cuttings are removed from the treatment location they may be transported to a production facility. At the facility, the desalinated cuttings may be mixed with a number of fillers including, for example, caliche, natural clays, top soil, gypsum, cements, and fly ash to produce a construction material. Examples of mixing fillers with cuttings are described in U.S. Pat. No. 7,059,805 issued to Addison. In this embodiment, the construction material may then be used to construct, inter alia, a base for a drilling operation or a production facility. Those of ordinary skill in the art will appreciate that other, non-solid fillers may also be added to the desalinated drill cuttings to further modify the properties of the construction materials. Examples of non-solid fillers may include water, polymers, and binding agents typically used to both dilute and/or solidify construction materials.

Furthermore, the addition of fillers to the desalinated drill cuttings may be used to further dilute contaminants to acceptable levels. For example, in one aspect, desalinated drill cuttings take from a lower level of a drill cuttings treatment operation may still contain chloride levels outside of an acceptable environmental level. However, by adding a filler, such as top soil, the net volume of the material containing the chloride is increased, and thus the concentration level is decreased. As such, the construction material created by mixing the desalinated drill cuttings with the filler may be within an acceptable environmental level, and may be used in commercial construction operations.

In this embodiment, a production facility base is first portioned off using berms 600 to confine the substrate to be deposited therein. Then a first layer 601 including top soil is deposited to form a base for the production facility. On top of the first layer 601, a second layer 602 including desalinated drill cuttings is deposited. Additional layers may then be deposited including, for example, a third layer 603 including additional top soil and a fourth layer 604 including desalinated drill cuttings. Those of ordinary skill in the art will appreciate that the order of they layers may vary according to the requirements of the specific construction project. For example, in alternate embodiments, it may be beneficial to have a first layer 601 including desalinated drill cuttings with multiple layers 602, 603, and 604 including mixtures of clays and top soil deposited thereafter.

Additionally, the ratio of fillers to desalinated drill cuttings, the order of the deposition, and the thickness of the layers may vary according to the compressive strength requirements for a given construction project. For example, in a construction project wherein the compressive strength of a production base must be at least 3000 pounds per square inch (e.g., to meet local building regulations), it may be necessary to increase the ratio of filler to desalinated drill cuttings. However, in other embodiments, the desalinated drill cuttings may contain material of a higher compressive strength than the filler. In such a situation, the ratio of filler to desalinated drill cuttings may preferably be decreased.

After building a production base including layers of desalinated drill cuttings 601, 602, 603, and/or 604, infrastructure 605 may be disposed thereon. Examples of infrastructure 605 that may be so disposed includes production equipment, drilling rigs, and fluid storage reservoirs. However, in alternate embodiments, the construction material may be used in the construction of, for example, roads. In such an embodiment, the construction material including the desalinated drill cuttings may be used as a sub-layer or base layer for roads at drilling sites. In still other embodiments, the construction material may be used as a road based on commercial roads. In such an embodiment, it may be necessary to test the compressive strength of the construction material, as described above, to ensure it meets the requirements of local and/or federal regulations.

Advantageously, embodiments disclosed herein may allow for greater efficiency in the treatment and disposal of drill cuttings. Because drill cuttings may contain high chloride levels that may otherwise be damaging to the environment, and because methods of the present disclosure may provide for the removal of these contaminants, methods disclosed herein promote environmentally conscience drilling operations. Furthermore, building sumps and trenches, as well as using drilling pads further may prevent cuttings runoff from damaging the local ecology of the drilling operation. Such efforts may further prevent ground water reservoirs from contamination due to high chloride levels in untreated drill cuttings.

Also advantageously, embodiments of the present disclosure may provide for a less expensive solution for drill cuttings remediation. Because the presently disclosed methods may use natural conditions, such as rainfall, to remove chlorides from the drill cuttings, the cost of remediation chemicals may be avoided. Additionally, because little work-over is required when treating the drill cuttings, the cost of labor and expensive equipment may also be avoided.

Finally, certain embodiments of the present disclosure provide for methods of treating and disposing drill cuttings. In these embodiments, the drill cuttings may be mixed with readily available filler, such as top soil, and reused in construction operations. By used the cuttings in construction operations, the cuttings do not have to be buried in the ground, which may have environmental impacts, such as the formation for sink areas in certain locations. Furthermore, using the drill cuttings in construction operations may decrease the cost of disposal because the construction material may be sold for a profit, thereby offsetting operation expenses.

While the present disclosure has been described with respect to a limited number of embodiments, those skilled in the art, having benefit of the present disclosure will appreciate that other embodiments may be devised which do not depart from the scope of the disclosure described herein. Accordingly, the scope of the disclosure should be limited only by the claims appended hereto.

What is claimed is:

1. A method for treating drill cuttings comprising:
depositing drill cuttings within a desalinator comprising a plurality of perforations on at least one side;
adding a liquid phase to the desalinator through the plurality of perforations on the at least one side;
washing the drill cuttings within the desalinator with the liquid phase added through the plurality of perforations on the at least one side; and
producing desalinated drill cuttings and a cuttings runoff.

2. The method of claim 1, further comprising:
collecting the cuttings runoff.

3. The method of claim 2, further comprising:
recycling the cuttings runoff into a drill mud reservoir.

4. The method of claim 2, further comprising:
evaporating the cuttings runoff to produce a salt.

5. The method of claim 1, further comprising:
evaporating the desalinated drill cuttings to remove additional liquid phase and cuttings runoff.

6. The method of claim 1, wherein the liquid phase comprises water.

7. The method of claim 1, further comprising:
using the desalinated drill cuttings in a construction operation.

8. The method of claim 1, wherein the washing comprises submerging the desalinator in the liquid phase.

9. The method of claim 1, wherein the washing comprises spraying the drill cuttings in the desalinator with the liquid phase.

* * * * *